Sept. 20, 1966 W. H. DORMAN 3,274,383

LUMINAIRE

Filed June 1, 1964 5 Sheets-Sheet 1

INVENTOR.
William H. Dorman

BY William D. Fosdick

AGENT

INVENTOR.
William H. Dorman

BY William D. Fosdick

AGENT

Sept. 20, 1966 W. H. DORMAN 3,274,383

LUMINAIRE

Filed June 1, 1964 5 Sheets-Sheet 3

INVENTOR.
William H. Dorman

BY William D. Fosdick

AGENT

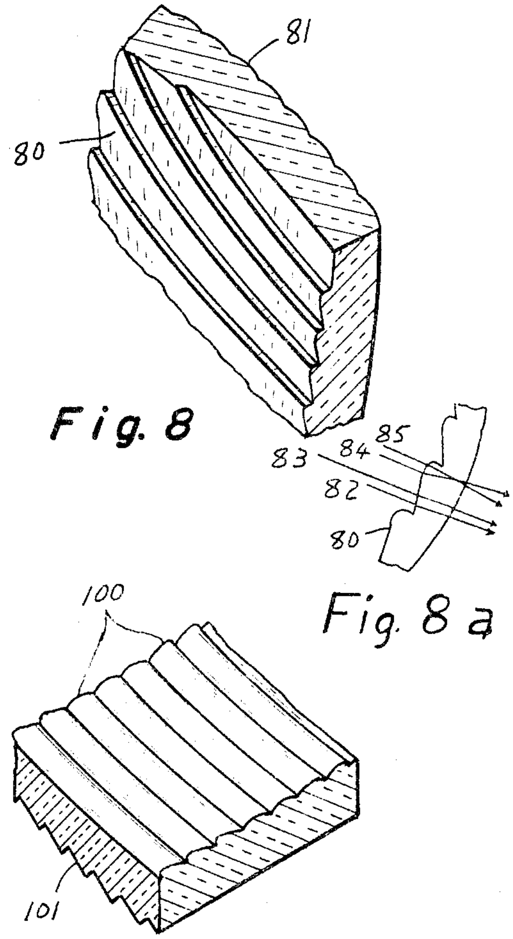
Fig. 8 Fig. 8a
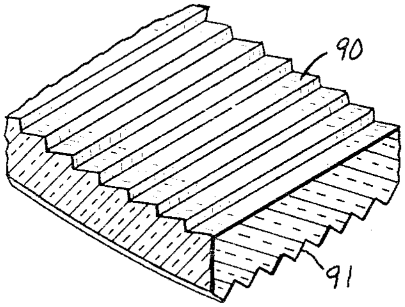
Fig. 9
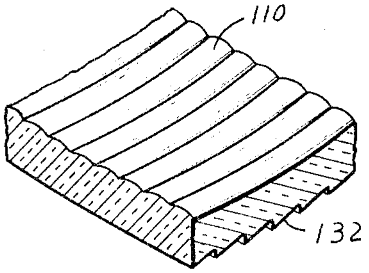
Fig. 11
Fig. 10
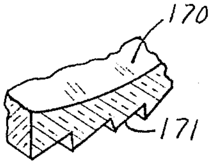
Fig. 17
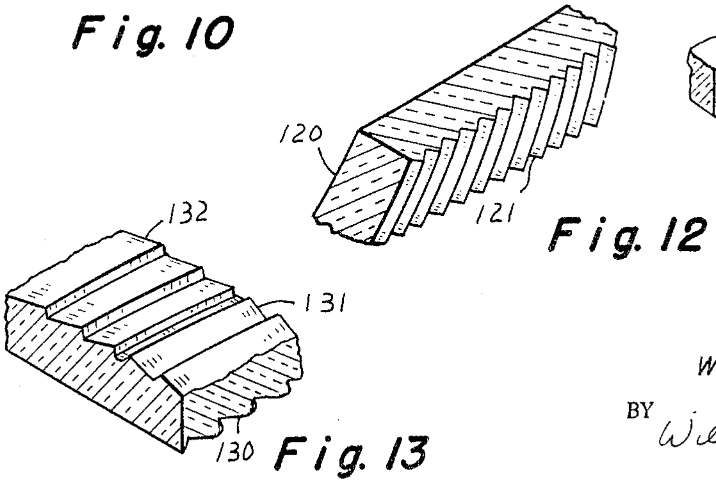
Fig. 12 Fig. 13
INVENTOR.
William H. Dorman
BY William D. Fosdick
AGENT INVENTOR.
William H. Dorman BY William D. Fosdick

AGENT

United States Patent Office 3,274,383

Patented Sept. 20, 1966

3,274,383

LUMINAIRE

William H. Dorman, Corning, N.Y., assignor to Corning Glass Works, Corning, N.Y., a corporation of New York Filed June 1, 1964, Ser. No. 371,273

7 Claims. (Cl. 240—106)

This invention relates to a luminaire adapted to distribute light within a rectangular area, two opposite sides of which are generally coincident with two curb lines of a street or highway. In particular, the invention relates to a refractor for use in such a luminaire.

It is an object of the invention to provide a luminaire which directs a maximum amount of light within such rectangular area and a minimum amount of light outside such rectangular area.

This and other objects, which will be apparent from the detailed description of the invention, are accomplished by the provision of a luminaire including a light source, a reflector, and a refractor having a plurality of distinct prismatic portions which are designed to illuminate with maximum efficiency designated areas of the above-mentioned rectangular area. Such portions of the refractor employ, in various combinations, smooth surfaces, curved lenticular prisms, prisms having plane faces, prisms having faces partly curved and partly plane, and catadioptric prisms capable of splitting a beam of light into two divergent beams. In its general outline, the refractor is of a conventional concavo-convex or semi-ovate form.

Figure 1:
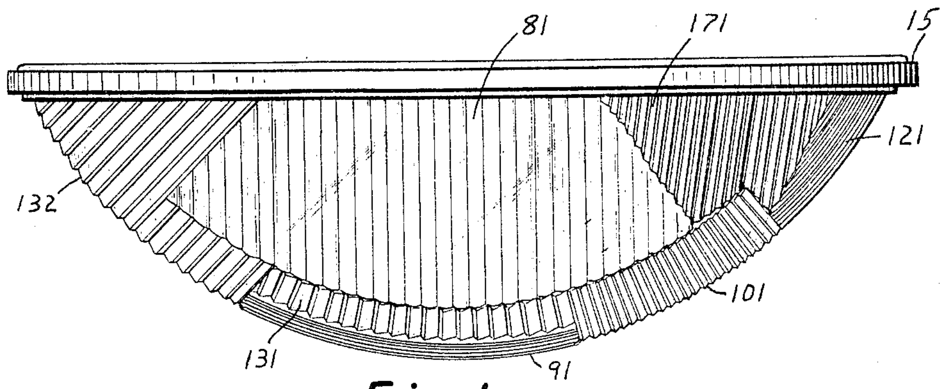
Figure 2:
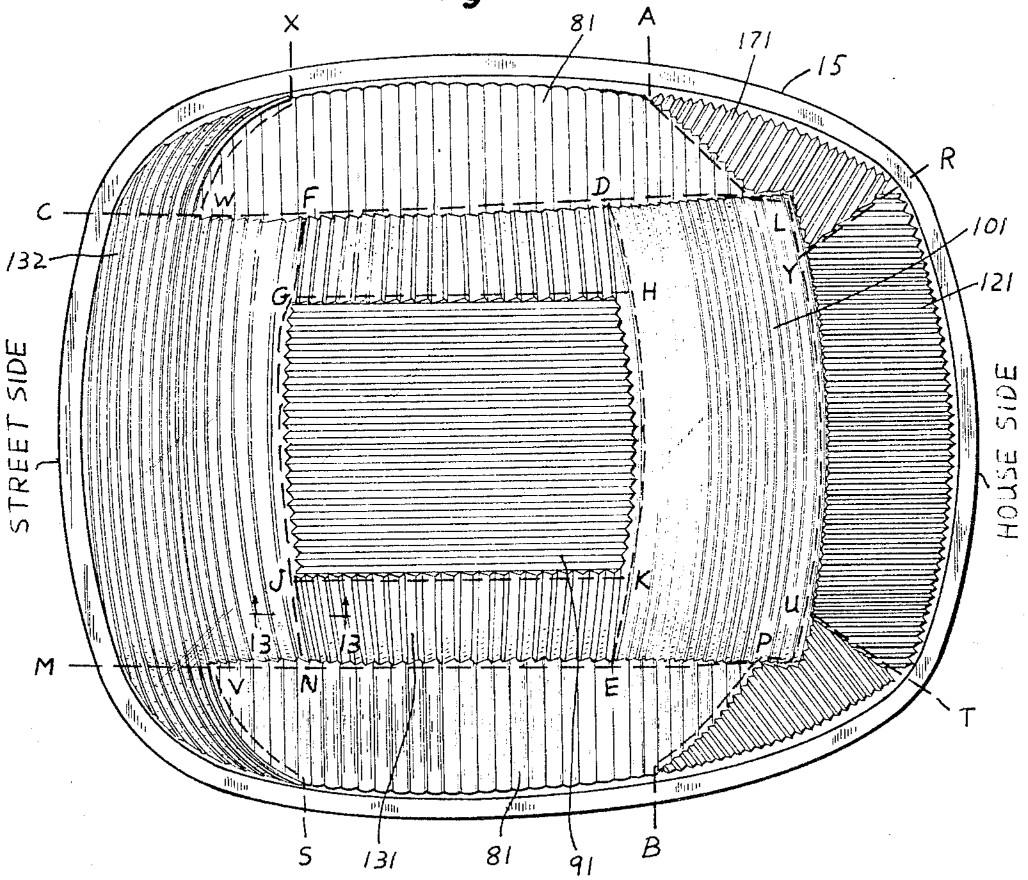
Figure 3:
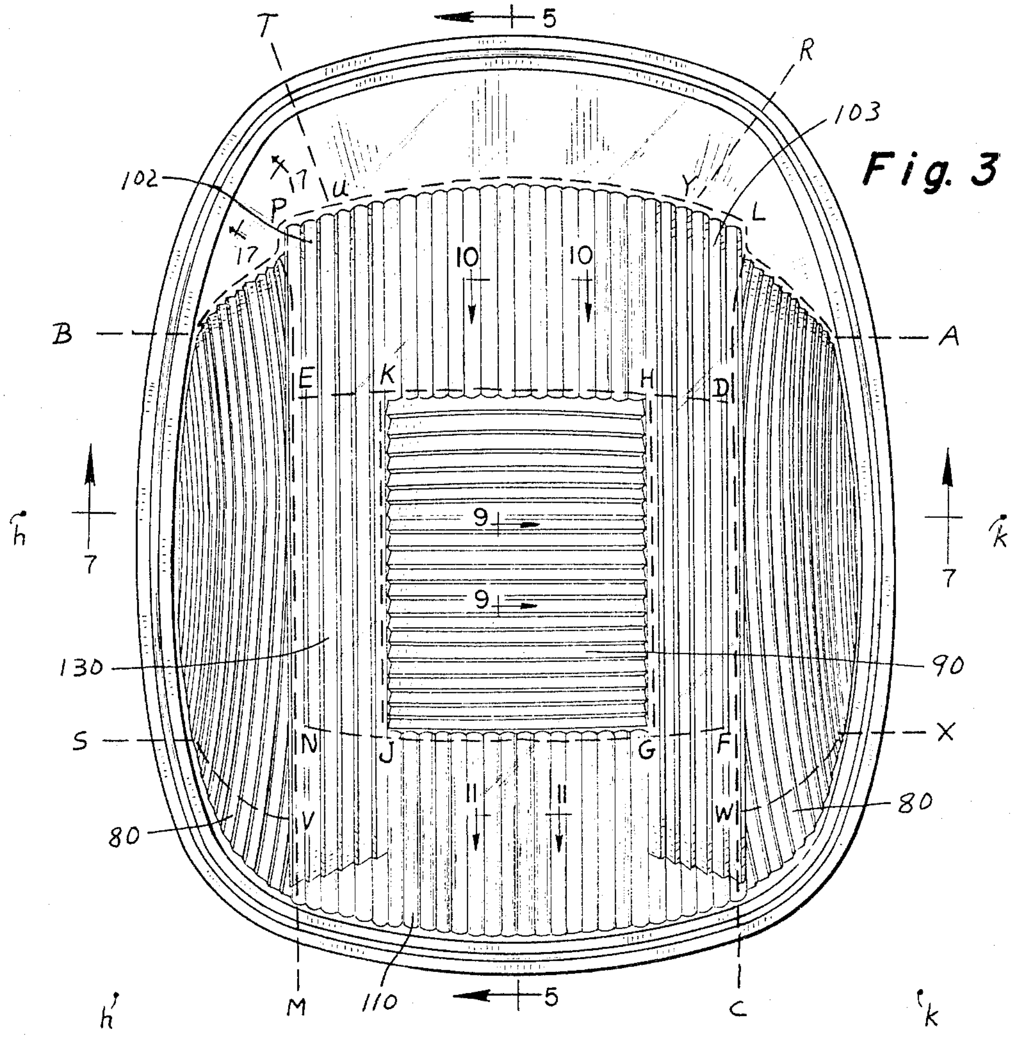
Figure 4:
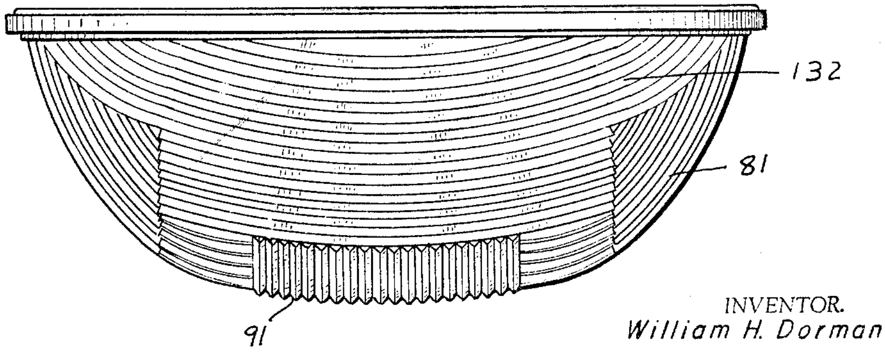
Figure 5:
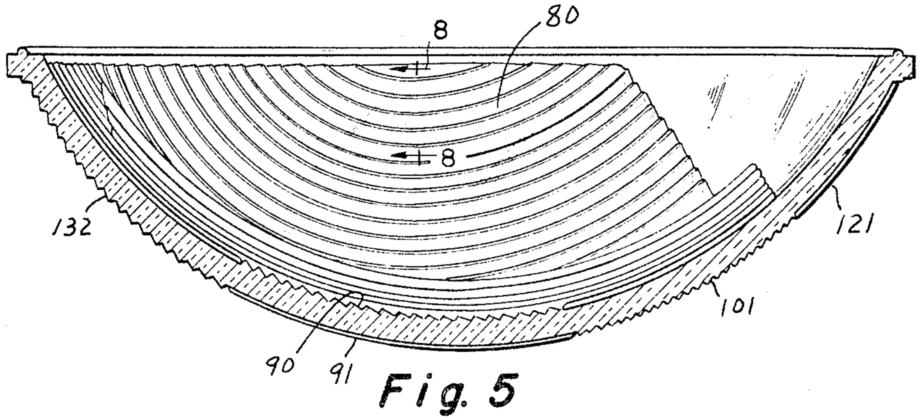
Figure 6:
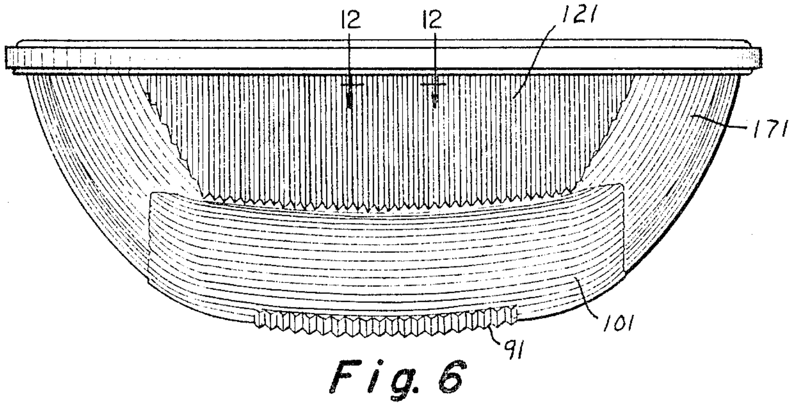
Figure 7:
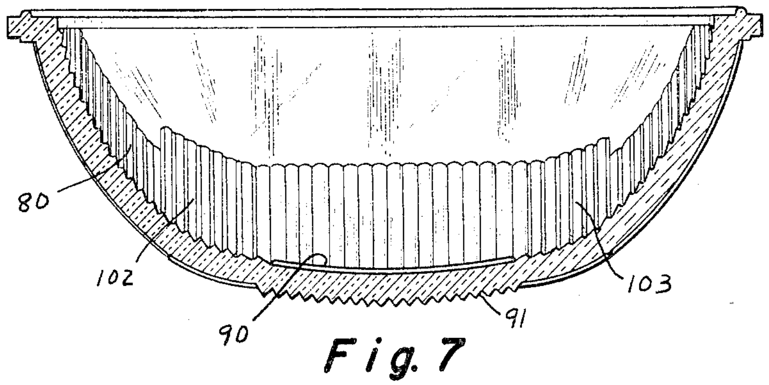
Figure 14:
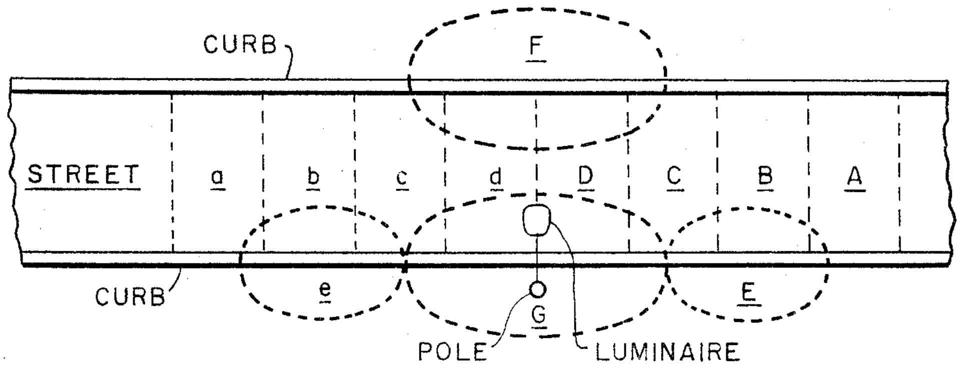
Figure 15:
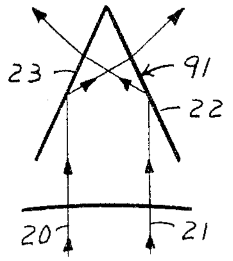
Figure 16:
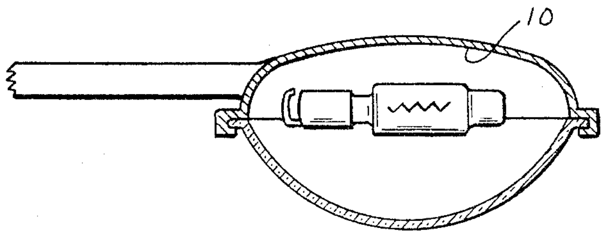

The design of the refractor will be illustrated with reference to the following drawing, in which:

FIGURE 1 is a side elevational view of the refractor employed in the present luminaire, FIGURE 2 is a plan view of the convex surface of the refractor, FIGURE 3 is a plan view of the concave surface of the refractor, FIGURE 4 is an elevational view of the street side of the refractor, FIGURE 5 is a sectional view taken on line 5—5 of FIGURE 3, FIGURE 6 is an elevational view of the house side of the refractor, FIGURE 7 is a sectional view taken on line 7—7 of FIGURE 3, FIGURE 8 is a sectional view of a portion of the refractor taken generally on line 8—8 of FIGURE 5, FIGURE 8*a* is a ray diagram, illustrating the paths of light rays through the refractor portion illustrated in FIGURE 8, FIGURE 9 is a sectional view of a portion of the refractor taken generally on line 9—9 of FIGURE 3, FIGURE 10 is a sectional view of a portion of the refractor taken generally on line 10—10 of FIGURE 3, FIGURE 11 is a sectional view of a portion of the refractor taken generally on line 11—11 of FIGURE 3, FIGURE 12 is a sectional view of a portion of the refractor taken generally on line 12—12 of FIGURE 6, FIGURE 13 is a sectional view of a portion of the refractor taken generally on line 13—13 of FIGURE 2, FIGURE 14 is a diagram of the pattern of light distribution produced along a street by the present luminaire, FIGURE 15 is a schematic view of a catadioptric prism of the type used in the present refractor, illustrating the paths of light rays passing therethrough, FIGURE 16 is a longitudinal sectional view of the luminaire of the invention, and FIGURE 17 is a sectional view of a portion of the refractor taken generally on line 17—17 of FIGURE 3.

The refractor employed in the present luminaire comprises a plurality of portions delineated generally by the broken lines of FIGURES 2 and 3. The refractor is symmetric about a plane passing through its longitudinal axis, i.e., a plane perpendicular to the plane of the paper in FIGURE 3 and passing through line 5—5.

Contemporary luminaires for street illumination are generally semi-ovate in form and are suspended above and besides a street with their longitudinal axes perpendicular to the centerline of the street. Due to this orientation, most of the light rays emitted by the light source and reflected by the reflector are directed generally up and down the street. It is the function of the present refractor further to distribute these light rays, as well as unreflected rays passing directly from the light source to the refractor, into the street in such a manner that the street is illuminated uniformly. Further, the refractor is designed to minimize the amount of light which is directed into areas outside the curb lines of the street by redirecting into useful areas within the curb lines light which would otherwise be directed into areas outside the curb lines.

A measure of the ability of a luminaire to confine available light within the street area is called its Coefficient of Utilization. A principal objective of modern luminaire design is the realization of as high a Coefficent of Utilization as is possible for a given street width. The novel arrangement of refractor portions and prism configurations on the surface thereof illustrated in the drawings results in the realization by the present luminaire of a maximum Coefficient of Utilization.

Light emitted by the present luminaire transversely at angles only slightly below the horizontal passes through the refractor portions delineated respectively by broken lines ALC and BPM. On the concave or inner surfaces of such portions are constructed a plurality of prisms 80, illustrated in FIGURES 8 and 8*a*. Prisms 80 have generally flat faces, but contain curved portions in the vicinity of their upper edges. The upper edges form the bases of the prisms, the term "base" being used herein in its conventional sense to refer to the portion of a prism in the direction of which light rays falling upon the incident surface thereof are refracted. The general cross-sectional configurations of prisms 80 and the effects thereof upon light rays passing therethrough are illustrated in FIGURE 8*a*. Light rays 82 and 83, which pass through a lower plane surface of the prisms 80 of refractor portions BPM, are refracted upwardly and directed to the street area designated as A in FIGURE 14. Light rays 84 and 85, which fall upon the convexly curved upper portions of the prisms, are directed at greater angles below the horizontal and fall on area B. Due to the convexity of the curved portions of prisms 80, rays 84 and 85, and other rays falling on the curved portion, are caused to diverge vertically so as to illuminate the entire length of area B. Due to the fact that the outer surface of this refractor portion is vertically convex, a slight vertical spread is effected in parallel light rays falling upon the plane surfaces of prisms 80. Since area A is located farther from the refractor than is area B, less angular divergence is required in order to spread light throughout this area than is required with light rays falling upon area B.

As can be seen from examination of FIGURE 3. prisms 80 are not only curved to fit the inner surface of the refractor, but also the prisms are curved with respect to the inner surface, to follow generally circular paths about centers, such as points *h* and *k* of FIGURES 3 and 4, located above the prisms. Thus, although light rays passing through the center of the side portions of the refractor, where the edges of prisms 80 are essentially horizontal, are elevated vertically upward, light rays passing through prisms 80 nearer their extremities are not only elevated but also concentrated laterally. Such action is necessary in order to confine the maximum candle power beam within the narrow curb boundaries of the roadway in the remote areas A and B. Increasingly greater refraction is required near the ends of the sides of the refractor since light rays falling thereon tend to be directed by the reflector and emitted from the light source of greater angles from the centerline of the street than light rays falling near the center of the sides of the refractor. A corollary advantage of the surface configurations of prisms 80 is the fact that light directed at any given point within areas A and B appears to emanate uniformly from the entire portion of the refractor on which prisms 80 are located. Thus, although maximum illumination of areas A and B is effected, minimum glare from direct observation of the luminaire is achieved.

In order to impart uniform slight horizontal divergence to light rays emitted from the central part of the sides of the refractor, vertical lenticular prisms 81 are formed on the outer surface of the refractor portions ALC and BPM. These prisms have edges which lie in planes substantially perpendicular to the longitudinal plane of symmetry of the refractor and are illustrated in plan view in FIGURE 2 and insectional view in FIGURE 8. The effect of such prisms is to cause light passing therethrough to converge, cross and subsequently diverge in order to spread light directed to areas A and B transversely with respect to the street in order uniformly to illuminate the area between the curbs.

Inasmuch as the present refractor is symmetric about a plane perpendicular to its rim 15 and passing through line 5—5 of FIGURE 3, it will be appreciated that light passing through refractor portion BPM will be projected onto areas A and B, while light passing through refractor portion ALC will be directed onto street areas *a* and *b*. Similarly, the remaining corresponding symmetric areas of the refractor will direct light symmetrically on each side of the broken line separating areas *d* and D in FIGURE 14. In view of this symmetry, subsequent description will be limited to those refractor portions which direct all or part of the light passing therethrough onto street and ground areas designated in the drawing by means of capitalized letters.

Light passing through the base portion of the refractor, delineated by broken line GHKJ is split into two beams, one beam illuminating area C and the other beam illuminating area *c*. Such splitting is effected by means of catadioptric prisms 91, illustrated in FIGURE 9. Prisms 91 have edges which lie in planes generally parallel to the longitudinal plane of symmetry of the refractor. The paths of rays of light passing through such prisms are illustraed in FIGURE 15. Rays 20 and 21 enter the refractor through the inner surface, are internally reflected at prism surfaces 22 and 23, respectively, and then emerge after being refracted by surfaces 23 and 22, respectively. The utilization of internal reflection by the prisms in this manner provides a greater divergence than can be effected between light rays by means of refraction only. The amount of beam divergence required for any given luminaire location and street dimensions can be calculated according to well-known optical principles. By way of example, the utilization of glass having an index of refraction of approximately 1.48 and vertex angles of 56° permits a beam divergence of 110°. With the same index of refraction, a vertex angle of 47° will produce a beam divergence of 90°.

The inner surface of refractor portion GHKJ is provided with a series of parallel prisms 90, arranged generally perpendicular to the respective prisms 91. Prisms 90 have their bases nearest the street side of the refractor, and hence refract light outwardly onto the street. The net effect of prisms 90 and 91 is to produce two beams of light having their centers generally coincident with the centers of areas C and *c* of the street. The normal divergence imparted to such light by the light source and the reflector causes substantially uniform illumination of the respective areas.

Light passing through the refractor side base portion delineated by broken lines NJKE illuminates street area D of FIGURE 14. On the inner surface of this portion of the refractor are a series of prisms 130, illustrated in FIGURE 3. Prisms 130 have edges which lie in planes generally parallel to the longitudinal plane of symmetry of the refractor. As illustrated in FIGURE 13, prisms 130 are of the same general type as prisms 80 illustrated in FIGURES 8 and 8*a*. Due to the fact that prisms 130 are at the base of the refractor, light rays falling thereon have a greater average vertical component than light rays falling upon prisms 80. Thus, the tendency of prisms 130 to direct light outwardly from under the refractor causes such light to be refracted only as far as area D.

On the outer surface of area NJKE are a plurality of prisms 131, illustrated in FIGURES 2 and 13. Prisms 131 have edges generally perpendicular to the edges of prisms 130. Since prisms 131 have their bases nearest the street side of the refractor, these prisms tend to refract outward and onto street area D light which would otherwise fall directly beneath the luminaire.

The refractor house side end portion delineated by broken line BPT of FIGURES 2 and 3 has a smooth inner surface 170 and an outer surface having thereon a series of prisms 171, illustrated in FIGURE 17, having their bases located nearest the street side of the refractor. The effect of this portion of the refractor upon light passing therethrough is to direct into area E light which would otherwise be directed at high angles off the street on the house side of the luminaire.

The street side portion of the refractor, delineated by the broken line SVNFWX and rim 15 of the refractor, has on its outer surface a series of prisms 132, illustrated in FIGURES 2 and 13, having edges lying in planes generally perpendicular to the longitudinal plane of symmetry of the refractor and having their bases located at the sides of the prisms farthest from refractor rim 15. The effect of such prisms is to bend downwardly to area F light which would otherwise be directed over the street and not utilized. As can be seen from FIGURE 3, the inner surface of this portion of the refractor has in its central part a series of lenticular prisms 110, illustrated in section in FIGURE 11. Such prisms tend to spread the light in longitudinal direction with respect to the street. As can be seen from FIGURE 3, the extreme edge parts of the inner surface of this portion of the refractor have on their interior surfaces parts of prisms 80, previously described. Between prisms 80 and prisms 110 are the extremities of prisms 130, previously described.

The house side base portion of the prism, delineated by broken line EDLP, has on its outer surface a series of prisms 101 having edges lying in planes generally perpendicular to the longitudinal plane of symmetry of the refractor and having their bases located at their sides away from the house side. Thus, the effect of these prisms is to direct into area G light which would otherwise be directed off to the side of the street on the house side. Prisms 101 are illustrated in cross section in FIGURE 10. The inner surface of this portion of the refractor has a series of prisms 100, illustrated in FIGURE 10, generally perpendicular to prisms 101. Prisms 100 are illustrated in FIGURE 10, and are of the same general type as prisms 80 of FIGURES 8 and 8*a*. These prisms have their bases located at their sides farthest from the plane of symmetry of the refractor and hence tend to spread light along area G in a longitudinal direction with respect to the street. The refracting power of the prisms increases with increasing distance from the plane of symmetry, thereby effecting uniform illumination of area G.

The house side portion of the refractor, delineated by broken line TUYR and rim 15, has a smooth interior surface 120 and an outer surface comprising a series of generally vertical conventional 90° totally reflecting prisms 121. Since prisms 121 reflect back into the luminaire substantially all light falling on this portion of the refractor and normal thereto, little or no light is directed into the windows of buildings adjacent to the street. The light which is reflected back into the luminaire falls on the remaining portions of the refractor and is distributed thereby in the manners previously described. In place of prisms 121, other reflecting surfaces, such as a silvered reflecting surface, may be employed.

It will be appreciated that in those areas of the present luminaire in which the prismatic elements on the surfaces thereof are intended to redirect light solely by means of refraction, the prisms of the outer and inner surfaces may be interchanged, i.e., the prisms from the outer surface may be placed on the inner surface and vice versa. In such cases, small adjustments in the precise shapes of the individual prisms may be made by those skilled in the art in order to compensate for variations in the patterns of illumination provided by the luminaire due to the interchanging of the prisms.

It should be understood that the term "prisms" is not used herein in its strict geometric sense, since the structures so described are not composed solely of plane surfaces, but are of necessity curved to fit the generally ovate contour of the refractor. In addition, the structures sometimes have surfaces which are curved in cross-section.

It will be appreciated by those skilled in the art that variations may be made from the design described above as a preferred embodiment of the invention. Accordingly, it is intended that the scope of the present invention be limited only by the scope of the appended claims.

I claim:

1. A refractor of a generally semi-ovate form having a generally flat rim forming its periphery, said refractor being symmetric about a longitudinal plane perpendicular to the plane of said rim, said refractor comprising on each side of said longitudinal plane a side portion, said side portions being symmetric about said longitudinal plane, each said side portion comprising an inner surface and an outer surface, one of said surfaces comprising a plurality of prisms having edges lying in planes substantially perpendicular to said longitudinal plane and having convex surfaces and the other said surface comprising a plurality of prisms having edges in the form of arcs of circles which are concave in the direction of said rim and which have centers at points on the sides of said rim opposite said arcs and having bases at their sides nearest said rim.

2. A refractor according to claim 1 in which the said prisms of each said side portion of said refractor which prisms have edges in the form of arcs of circles have, in addition, surfaces which are convex near their bases and planar elsewhere.

3. A refractor of a generally semi-ovate form having a generally flat rim forming its periphery, said refractor being symmetric about a longitudinal plane perpendicular to the plane of said rim, said refractor comprising at one end of said longitudinal plane a street side portion comprising an inner surface and an outer surface, one of said surfaces having in a central part a series of prisms having edges lying in planes substantially parallel to said longitudinal plane and having convex surfaces and at each end of the same surface of said portion areas comprising a plurality of prisms having edges lying in planes substantially parallel to said longitudinal plane and having bases at their sides farthest from said longitudinal plane, and the other said surface of said street side portion having thereon a plurality of prisms having edges lying in planes substantially perpendicular to said longitudinal plane and having bases at their edges farthest from said rim, at the remaining end of said longitudinal plane a house side portion having a surface capable of reflecting light falling upon its inner surface, and on each side of said longitudinal plane a side portion, said side portions being symmetric about said longitudinal plane, each said side portion comprising an inner surface and an outer surface, one of said surfaces comprising a plurality of prisms having edges in planes substantially perpendicular to said longitudinal plane and having convex surfaces and the other said surface comprising a plurality of prisms having edges in the forms of arcs of circles having centers at points on the side of said rim opposite said arcs and having bases at their sides nearest said rim.

4. A refractor according to claim 3 which includes a base portion, said base portion comprising an inner surface having thereon a plurality of prisms having edges lying in planes substantially perpendicular to said longitudinal planes and having bases at their sides nearest said street side portion of said refractor and an outer surface comprising a plurality of catadioptric prisms having edges lying in planes substantially parallel to said longitudinal plane and having the ability to split a beam of light falling substantially normal to said base portion of said refractor into two beams diverging from said longitudinal plane.

5. A refractor according to claim 4 which includes between said base portion and said house side portion a house side base portion having an inner surface and an outer surface, one of said surfaces comprising a plurality of prisms having edges lying in planes perpendicular to said longitudinal plane and having bases at their sides farthest from said house side portion of said refractor and the other said surface comprising a plurality of prisms having edges lying in planes generally parallel to said longitudinal plane and having bases at their sides farthest from said longitudinal plane.

6. A refractor according to claim 5 which includes between each said side portion and said house side portion a house side end portion bounded by one said side portion, one said house side base portion and one said house side portion, each said house side end portion comprising a smooth inner surface and an outer surface having thereon a plurality of prisms having edges lying in planes substantially perpendicular to said rim and having bases at their sides nearest said street side portion.

7. A refractor according to claim 6 which includes a side base portion between said base portion and each said side portion, each said side base portion comprising an inner surface and an outer surface, one said surface comprising a plurality of prisms having edges lying in planes substantially perpendicular to said longitudinal plane and having bases nearest said street side portion and the other said surface comprising a plurality of prisms having edges lying in planes substantially parallel to said longitudinal plane and having bases at their edges farthest from said longitudinal plane.

References Cited by the Examiner

UNITED STATES PATENTS

| | | | |
|---|---|---|---|
| 2,566,126 | 8/1951 | Franck | 240—106 X |
| 2,814,723 | 11/1957 | Franck et al. | 240—106 |
| 3,113,730 | 12/1963 | Dorman et al. | 240—106 |
| 3,131,874 | 5/1964 | Fairbanks | 240—25 X |
| 3,179,793 | 4/1965 | Franck | 240—106 X |

NORTON ANSHER, *Primary Examiner.*

C. R. RHODES, *Assistant Examiner.*